HALOPROPARGYL ARYL ETHER COMPOUNDS

Shigeo Seki, Bunzo Nomiya, and Hiroshi Ogawa, Tokyo, Japan, assignors to Meiji Seika Kaisha, Ltd., Tokyo, Japan, a corporation of Japan
No Drawing. Filed June 6, 1963, Ser. No. 285,871
Claims priority, application Japan, June 30, 1962, 37/26,896; Mar. 7, 1963, 38/10,431
13 Claims. (Cl. 260—465)

This invention relates to new halopropargyl aryl ether compounds and to processes for the production of the same compounds.

The new compounds halopropargyl aryl ethers according to this invention may be represented by the following general formula

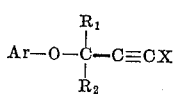

wherein Ar stands for an aryl group, particularly phenyl and naphthyl groups, which bears on the aromatic nucleus at least one of the substituents selected from the group consisting of halogen, alkyl, alkoxy, alkynyloxy, phenyl, acyl, acylamino, carboxyl, carboalkoxy, carbamoyl, nitro and cyano radicals; $R_1$ and $R_2$ may be the same or different and stand for a member selected from the group consisting of hydrogen, alkyl and phenyl groups; and X stands for a halogen atom selected from the group consisting of bromine, iodine and chlorine. These new compounds according to the present invention have not been reported in any publication, but we have now found that these halopropargyl aryl ether compounds show an activity inhibitory to the growth of eumycetes and are particularly useful for the control or treatment of water-eczema.

This invention also includes a process for the production of these new halopropargyl aryl ether compounds which comprises reacting a proper halogenation agent in a proper manner with the corresponding propargyl aryl ether compound of the general formula

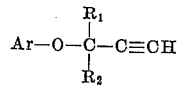

wherein Ar, $R_1$ and $R_2$ have the same significances as aforesaid.

The corresponding propargyl aryl ether compound used as the starting material in the process of the invention may be readily prepared by reacting a proper propargyl halide in a proper solvent such as alcohol with an alkali metal salt of phenol or naphthol which bears the corresponding substituent or substituents on the aromatic nucleus.

As the halogenation methods which may be employed in the process of the invention, there are mentioned conventional methods of halogenation which are able to convert an acetylene compound into the corresponding acetylene halide. For instance, there may be applied Adolf Baeyer's method according to which an acetylene compound is added to an aqueous suspension of cuprous hydroxide and the resulting cuprous acetylide is reacted with a halogen to give the acetylene halide compound (refer to Ber., 18, 2284 (1855)); method of Straus, F., et al., according to which an acetylene compound is reacted with a salt of hypo-halogenous acid to give the acetylene halide compound (refer to Ber. 63, 1868 (1930)); and J. U. Nef's method according to which an acetylene compound is reacted with a halogen and the resulting dihalogen compound is reacted with an alkali metal to give the acetylene halide compound (refer to Ann., 308, 325 (1899)). In case the halogenation agent is chlorine gas, the process of the invention may be easily carried out by reacting chlorine gas with a starting propargyl aryl ether compound in a proper solvent such as methanol, ethanol and water at a temperature of $-20°$ C. to $+40°$ C., preferably $+5°$ C. to $+15°$ C. and in the presence of an alkali metal hydroxide such as sodium and potassium hydroxides.

Among the particularly useful products which can be obtained by the process of the present invention, there may be mentioned e.g. 4-bromophenyl iodopropargyl ether, 2,6-dichlorophenyl iodopropargyl ether, 2,4,5-trichlorophenyl iodopropargyl ether, 4-bromophenyl chloropropargyl ether, 2,4 - dichlorophenyl chloropropargyl ether and 2,4,5-trichlorophenyl chloropropargyl ether.

In order to demonstrate the anti-microorganism activity of the halopropargyl aryl ether compounds of the invention, the minimum concentration of some compounds inhibitory to the growth of various microorganisms are determined by the serial dilution method. The results obtained are shown in Table 1 below. The minimum inhibitory concentration is given in $\gamma$/ml.

TABLE 1

| Names of Compounds | Trichophyton asteroides | Trichophyton interdigitale | Trichophyton rubrum | Staphylococcus pyogenes aureus 209-p | Streptococcus pyogenes Cook Group A | Diplococcus pneumoniae DP-1 Neufield Type 1 | Salmonella typhi o-901-W | Bacillus subtilis PCI 219 | Mycobacterium tuberculosis var. hominis H 37 Rv | Toxicity $LD_{50}$ (mg./kg.) mouse |
|---|---|---|---|---|---|---|---|---|---|---|
| 2,4,5-trichlorophenyl iodopropargyl ether. | 0.25 | 0.25 | 0.78 | 2.0 | 0.97 | 0.24 | >250 | 1.95 | 31.2 | i.p.=500. oral>3,000. |
| 2,6-dichlorophenyliodopropargyl ether. | 0.48 | | | 7.8 | 3.9 | 1.95 | >250 | 3.9 | | |
| 2,6-dichloro-4-ethoxymethylphenyliodo propargyl ether. | 3.9 | 3.12 | 3.12 | 1.56 | 3.12 | 1.56 | >100 | 3.12 | | |
| P-bromophenyl iodopropargyl ether. | 0.156 | 0.312 | 0.312 | 7.8 | 7.8 | 3.9 | 15.6 | 3.9 | | |
| O-iodopropargyloxy benzamide. | 31.2 | | | >250 | >50 | 6.25 | >250 | 6.25 | | |
| Pentachlorophenyliodopropargyl ether. | >100 | 50 | 25 | | | | | | | |
| P-nitrophenyl iodopropargyl ether. | 1.95 | 1.95 | 1.95 | >250 | >250 | >250 | >250 | >250 | | |
| P-acetylaminophenyl idopropargyl ether. | 15.6 | 0.97 | 3.9 | 250 | 62.5 | 62.5 | >250 | 62.5 | | |
| 2,4-dichloronaphthyl iodopropargyl ether. | 3.9 | 62.5 | 1.95 | 62.5 | 0.97 | 0.48 | >250 | 15.6 | | |
| 2,4-dichlorophenyl iodopropargyl ether. | 0.078 | 0.312 | 0.156 | 3.9 | 1.95 | 0.97 | >250 | 0.97 | | |
| P-diphenyliodopropargyl ether. | 0.97 | 1.56 | 6.25 | >250 | >250 | 62.5 | >250 | >250 | | i.p.=320 oral >3000. oral>500. |

TABLE 1—Continued

| Names of Compounds | Microorganisms tested—Sample | | | | | | | | | Toxicity LD₅₀ (mg./kg.) mouse |
|---|---|---|---|---|---|---|---|---|---|---|
| | Trichophyton asteroides | Trichophyton interdigitale | Trichophyton rubrum | Staphylococcus pyogenes aureus 209-p | Streptococcus pyogenes Cook Group A | Diplococcus pneumoniae DP-1 Neufield Type 1 | Salmonella typhi o-901-W | Bacillus subtilis PCI 219 | Mycobacterium tuberculosis var. hominis H 37 Rv | |
| P-chlorophenyl iodopropargyl ether. | 0.078 | 0.312 | 0.156 | 7.8 | 3.9 | 3.9 | 15.6 | 7.8 | -------- | i.p.=152 oral>3000 |
| 5-chloro-2-iodopropargyloxy benzamide. | 0.078 | 1.25 | 0.625 | 12.5 | 31.2 | 125 | >250 | 15.6 | -------- | oral>3000 |
| P-dichloroacetylaminophenyl iodopropargyl ether. | 0.48 | 0.39 | 0.78 | >250 | 7.8 | 31.2 | >250 | 31.2 | -------- | oral>1000 |
| P-propargyloxyphenyl iodopropargyl ether. | 0.156 | 1.25 | 0.625 | 250 | 15.6 | 7.8 | >250 | >250 | -------- | |
| P-iodophenyl iodopropargyl ether. | 0.156 | 0.625 | 0.312 | 7.8 | 15.6 | 7.8 | >250 | >250 | -------- | i.p.=420. oral>3,000. |
| P-β-hydroxyethoxyphenyl iodopropargyl ether. | 0.97 | 0.78 | 0.78 | 62.5 | 62.5 | 125 | 250 | 62.5 | -------- | |
| Pentachlorophenyl bromopropargyl ether. | >250 | >250 | >50 | >100 | 12.5 | 25 | >100 | 50 | -------- | |
| P-bromophenyl bromopropargyl ether. | 100 | >110 | 50 | >100 | 12.5 | 12.5 | >50 | >50 | >50 | |
| P-bromophenyl chloropropargyl ether. | >250 | >250 | >50 | >100 | 50 | 50 | 100 | 100 | >50 | |
| 2,4,5-trichlorophenyl bromopropargyl ether. | >100 | >250 | >50 | >250 | 12.5 | 6.25 | >250 | >250 | 250 | |
| 2,4,5-trichlorophenyl chloropropargyl ether. | 25 | >50 | 25 | >250 | 6.25 | 6.25 | >250 | >250 | 250 | |
| 2-methyl-4,6-dichlorophenyl iodopropargyl ether. | 1.56 | 3.12 | 3.12 | 1.56 | 1.56 | 0.78 | >250 | 0.39 | >250 | |
| P-fluorophenyl iodopropargyl ether. | 0.39 | 1.56 | 0.78 | 6.25 | 6.25 | 6.25 | 12.5 | 6.25 | 10-50 | |
| P-chlorophenyl bromopropargyl ether. | 6.25 | 6.25 | 12.5 | >250 | 12.5 | 25 | >250 | >100 | >50 | |
| 2,4-dichlorophenyl bromopropargyl ether. | 3.12 | 6.25 | 12.5 | >250 | >100 | 6.25 | >250 | >250 | 10-50 | |
| 2,4-dichlorophenyl chloropropargyl ether. | 6.25 | 12.5 | 25 | 25 | 3.12 | 3.12 | >250 | 12.5 | >50 | |
| P-carboxyphenyliodopropargyl ether. | 0.39 | 0.78 | 0.78 | 25 | 25 | 25 | >100 | 25 | -------- | |
| 2-nitro-4-methylphenyl iodopropargyl ether. | 0.19 | 0.39 | 0.78 | 6.25 | 6.25 | 6.25 | >100 | 6.25 | -------- | |
| 3-nitro-4-methylphenyl iodopropargyl ether. | 0.19 | 0.39 | 0.78 | 6.25 | 6.25 | 6.25 | >100 | 3.12 | -------- | |
| P-acetylphenyl iodopropargyl ether. | >100 | >100 | >100 | >50 | 25 | 12.5 | >50 | >50 | -------- | |
| P-carbomethyoxyphenyl iodopropargyl ether. | 1.56 | 3.12 | 3.12 | 6.25 | 6.25 | 12.5 | >100 | 6.25 | -------- | |
| P-carbomethyoxyphenyl bromopropargyl ether. | 6.25 | 3.12 | 12.5 | >100 | >100 | 12.5 | >100 | >100 | -------- | |
| P-cyanophenyl iodopropargyl ether. | 0.78 | 1.56 | 3.12 | 6.25 | 12.5 | 25 | >100 | 25 | -------- | |

For the purpose of comparison, the activity of the halopropargyl aryl ether compounds of the present invention may be compared to the activity of the coresponding non-halogenated propargyl aryl ether compounds which are used as the starting material for the process of the present invention. To this end, the minimum concentrations of some compounds inhibitory to *Trichophyton interdigitale, Trichophyton asteroides* and *Trichophyton rubrum* are tested by the conventional dilution method and given in γ/ml. in Table 2 below.

TABLE 2

| Structural formulae of compounds tested | Names of the fungi tested | | |
|---|---|---|---|
| | Trichophyton interdigitale | Trichophyton asteroides | Trichophyton rubrum |
| 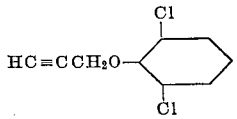 | -------- | 125 | -------- |
| 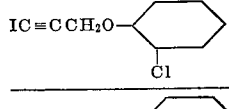 | 0.625 | 0.156 | 0.625 |

TABLE 2—Continued

| Structural formulae of compounds tested | Names of the fungi tested | | |
|---|---|---|---|
| | Trichophyton interdigitale | Trichophyton asteroides | Trichophyton rubrum |
| 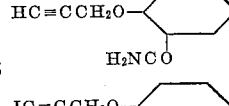 | -------- | 1,000 | -------- |
| 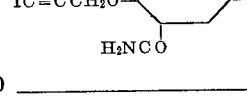 | -------- | 0.5 | -------- |
| 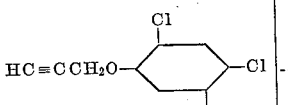 | -------- | 250 | -------- |
| 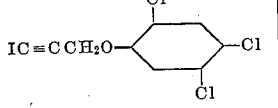 | -------- | 0.078 | -------- |

For this table, it is clear that the iodopropargyl aryl ether compounds of this invention exhibit considerably higher activity than the corresponding non-halogenated propargyl aryl ether compounds from which the aforesaid halopropargyl aryl ether compounds started.

In order to illustrate the process of the invention the folowing examples are now shown but the scope of the invention is not limited to them.

*Example 1*

8.5 grams of para-bromophenyl propargyl ether (B.P. 80–87° C./1.5 mm. Hg) are added to an aqueous solution of cupro-ammonium complex salt which has been prepared by warming a mixture of 8.0 grams of cuprous chloride, 20.0 grams of ammonium carbonate and 200 cc. of water to 50° C. The resulting admixture is shaked vigorously. The cuprous acetylide deposited is filtered, washed with water and suspnded in 200 cc. of water. The suspension is added under agitation with a solution of 10.4 grams of iodine and 10.4 grams of potassium iodide in 25 cc. of water. The mixture is stirred for a period of 1 hour. The precipitation is subsequently filtered, washed with water and then extracted with ether. After the etheral extract has been dried, the ether is distilled off. Recrystallisation of the residue from n-hexane gives about 9.8 grams of para-bromophenyl iodopropargyl ether, M.P. 70–71° C.

*Example 2*

5.3 grams of 2,6-dichlorophenyl propargyl ether (M.P. 45–46° C.) are added to an aqueous solution of cupro-ammonium complex salt which has been prepared by warming a mixture of 5.5 grams of cuprous chloride, 14.0 grams of ammonium carbonate and 100 cc. of water to 50° C. The resulting admixture is shaked vigorously. The cuprous acetylide deposited is filtered, washed with water and suspended in 150 cc. of water. The resulting suspension is mixed under agitation with a solution of 3.6 grams of iodine and 3.6 grams of potassium iodide in 10 cc. of water. The mixture is stirred for a period of 1 hour. The precipitation is filtered, washed with water and extracted with ether. After the etheral extract has been dried, the solvent is distilled off. Recrystallisation of the residue from n-hexane gives about 5.0 grams of 2,6-dichlorophenyl iodopropargyl ether, M.P. 49–50° C.

*Example 3*

4.7 grams of 2,4,5-trichlorophenyl propargyl ether (M.P. 64–65° C.) are added to an aqueous solution of cupro-ammonium complex salt which has been prepared by warming a mixture of 4.0 grams of cuprous chloride, 11.0 grams of ammonium carbonate and 20 cc. of water to 50° C. The resulting admixture is shaked vigorously. The cuprous acetylide deposited is filtered, washed wtih water and suspended in 100 cc. of water, and the suspension is mixed under agitation with a solution of 5.0 grams of iodine and 5.0 grams of potassium iodide in 15 cc. of water. The mixture is stirred for a period of 1 hour. The preciptation is filtered, washed with water and extracted with ether. After the drying of the etheral extract, the solvent is distilled off. Recrystallisation of the residue from n-hexane gives about 5.6 grams of 2,4,5-trichlorophenyl iodopropargyl ether, M.P. 114–115° C.

*Example 4*

6.8 grams of 2,4,6-trichlorophenyl propargyl ether are added to 70 cc. of methanol and this solution is then mixed with a solution of 3.5 grams of sodium hydroxide in 10 cc. of water. The resulting mixture is cooled down in an ice-water bath and added under agitation with 7.5 grams of iodine in small portions. The temperature of the mixture is kept at 5°–10° C. After the whole amount of iodine has been added, the solution is stirred for further one hour. The crystal deposited is then filtered, washed with water and dried. Recrystallisation from isopropyl alcohol gives about 8.0 grams of 2,4,5-trichlorophenyl iodopropargyl ether.

*Example 5*

4.0 grams of pentachlorophenyl propargyl ether are dissolved in carbon tetrachloride and this solution is mixed with a solution of 2.1 grams of bromine in 20 cc. of carbon tetrachloride in small portions with irradiation of sunlight. After the color of bromine has been vanished, the carbon tetrachloride is distilled off. Recrystallisation of the residue from isopropyl alcohol gives about 3.3 grams of pentachlorophenyl 2,3-dibromoallyl ether, M.P. 120–121° C.

16.5 grams of pentachlorophenyl 2,3-dibromoallyl ether so obtained are added to a solution of sodium alcoholoate which has been prepared by dissolving 0.82 gram of metallic sodium in 50 cc. of ethanol. The mixture is boiled under reflux for 1 hour and then distilled so as to remove the ethanol. Addition of 100 cc. of water to the mixture causes the deposition of crystal which is then filtered and dried. Recrystallisation from isopropyl alcohol gives about 5.1 grams of pentachlorophenyl bromopropargyl ether, M.P. 127–129° C.

*Example 6*

13.5 grams of para-nitrophenyl propargyl ether (M.P. 112–112.5° C.) are dissolved in 100 cc. of methanol and the resulting solution is then mixed with a solution of 11 grams of potassium hydroxide in 25 cc. of water. The mixture is cooled down in an ice-water bath and added under agitation with 19.3 grams of iodine in small portions while the temperature of the mixture is kept at 5°–10° C. After the whole amount of iodine has been added, agitation is continued for further one hour. Addition of 200 cc. of water causes the deposition of crystal which is then filtered, washed with water and dried. Recrystallisation from methanol gives about 16.0 grams of para-nitrophenyl iodopropargyl ether, M.P. 184–185° C.

*Example 7*

9.0 grams of para-acetylaminophenyl propargyl ether, M.P. 114–116° C. are dissolved in 100 cc. of methanol and the resulting solution is mixed with a solution of 7.0 grams of potassium hydroxide in 15 cc. of water. The mixture is then cooled down in an ice-water bath and added under agitation with 18 grams of iodine in small portions at a temperature of 5°–10° C., so that the halogenation reaction takes place. After the whole amount of iodine has been added, agitation is continued for further one hour. Addition of 200 cc. of water causes the deposition of crystal which is then filtered, washed with water and dried. Subsequent recrystallisation from isopropyl alcohol gives about 9.5 grams of para-acetylaminophenyl iodopropargyl ether, M.P. 138–139° C.

*Example 8*

5.3 grams of ortho-propargyl hydroxybenzamide, M.P. 147.5–148° C. and 3.7 grams of potassium hydroxide are dissolved in 40 cc. of water. The resulting solution is cooled down in an ice-water bath and added under agitation with 7.7 grams of iodine in smal portions while the temperature of the admixture is kept at 5°–10° C. After one hour's agitation, the crystal deposited is filtered, washed with water and dried. Subsequent recrystallisation from methanol gives about 5.5 grams of orthor-iodopropargyl hydroxybenzamide, M.P. 173–174° C.

*Example 9*

21.4 grams of 2-methyl-4,6-dichlorophenyl propargyl ether, M.P. 76–77° C. are dissolved in 300 cc. of methanol and the resulting solution is mixed with a solution of 8.8 grams of sodium hydroxide in 20 cc. of water. The mixture is cooled down in an ice-water bath and added with 25.4 grams of iodine under agitation in the same conditions as in Example 6. Subsequent similar treatment followed by recrystallisation from isopropyl alcohol gives about 25.0 grams of 2-methyl-4,6-dichlorophenyl iodopropargyl ether, M.P. 91–91.5° C.

Example 10

4.5 grams of 2,4-dichloronaphthyl propargyl ether, M.P. 97–98° C. are dissolved in 50 cc. of methanol and the resulting solution is mixed with a solution of 3.0 grams of potassium hydroxide in 10 cc. of water. The mixture is then added with 7.0 grams of iodine under the same conditions as in Example 6. Addition of 100 cc. of water causes the deposition of crystal which is then filtered, washed with water and dried. Recrystallisation from methanol gives 5.5 grams of 2,4-dichloronaphthyl iodopropargyl ether, M.P. 109–110° C.

Example 11

20 grams of 2,4-dichlorophenyl propargyl ether, M.P. 49–50° C. are dissolved in 200 cc. of methanol and the resulting solution is mixed with a solution of 8.8 grams of sodium hydroxide in 20 cc. of water. The mixture is cooled down in an ice-water bath and dropwise added with 16.0 grams of bromine in small portions and under agitation while the temperature of the mixture is kept at 5–10° C. After the whole amount of bromine has been added, the agitation is continued for further one hour. Addition of 300 cc. of water causes the deposition of crystal which is then filtered, washed with water and then dried. Subsequent recrystallisation from methanol gives about 23.0 grams of 2,4-dichlorophenyl bromopropargyl ether, M.P. 76–76.5° C.

Example 12

21.1 grams of p-bromophenyl propargyl ether are dissolved in 200 cc. of methanol and the resulting solution is added with a solution of 8.8 grams of sodium hydroxide in 15 cc. of water. The mixture is cooled down in an ice-water bath and passed therethrough with chlorine gas under agitation and at a temperature of 10–15° C. Methanol is then distilled off under reduced pressure. Addition of 200 cc. of water to the residue causes the deposition of an oily substance which is then extracted with ether. The etheral extract is dried and then distilled so as to remove the ether. Petroleum ether is added to the remaining oily substance and the crystal deposited is recrystallised from ether. Yield is about 13.0 grams of p-bromophenyl chloropropargyl ether, M.P. 28–29° C.

Example 13

20.0 grams of 2,4-dichlorophenyl propargyl ether is dissolved in 200 cc. of methanol and the resulting solution is mixed with a solution of 8.8 grams of sodium hydroxide in 15 cc. of water. The resultant mixture is cooled down in an ice-water bath and passed therethrough with chlorine gas under agitation while the temperature of the mixture is kept at 10–15° C. Methanol is distilled off under reduced pressure and 200 cc. of water are added to the residue. An oily substance deposited is extracted with ether and the ethreal extract so obtained is dried. Distillation off of the ether gives an oily residue which is then distilled under a reduced pressure of 0.01 mm. Hg to recover an oily fraction which can be distilled out at the bath temperatures between 120° C. and 130° C. Yield is about 15.0 grams of 2,4-dichlorophenyl chloropropargyl ether.

Example 14

10.0 grams of 2,4,5-trichlorophenyl propargyl ether are dissolved in 150 cc. of ethanol and the resulting solution is mixed with a solution of 4.8 grams of potassium hydroxide in 10 cc. of water. The resultant mixture is cooled down in an ice-water bath and passed therethrough with chlorine gas under agitation while the temperature of the reaction mixture is kept at 5° C.–10° C. Subsequent addition of 300 cc. of water causes the deposition of crystal which is then filtered, washed with water and dried. Recrystallisation from isopropyl alcohol gives about 8.1 grams of 2,4,5-trichlorophenyl chloropropargyl ether, M.P. 68–69° C.

Example 15

15.2 grams of pentachlorophenyl propargyl ether, M.P. 139–140° C. are dissolved in 300 cc. of methanol and the resulting solution is added with a solution of 4.4 grams of sodium hydroxide in 10 cc. of water. The admixture is cooled down in an ice-water bath and then added under agitation with 12.7 grams of iodine in small portions while the temperature of the mixture is kept at 5–10° C. After the whole amount of iodine has been added, the agitation is continued for further one hour. Subsequent addition of 500 cc. of water causes the deposition of crystal which is filtered, washed with water and dried. Recrystallisation from isopropyl alcohol gives about 17.0 grams of pentachlorophenyl iodopropargyl ether, M.P. 140–140.5° C.

Example 16

20.0 grams of 2,4-dichlorophenyl propargyl ether, M.P. 49–50° C. are dissolved in 200 cc. of methanol and the resulting solution is mixed with a solution of 8.8 grams of sodium hydroxide in 20 cc. of water. The admixture is cooled in an ice-water bath and then added under agitation with 25.4 grams of iodine in small portions while the temperature of the mixture is kept at 5–10° C. After the whole amount of iodine has been added, the agitation is continued for further one hour. Subsequent addition of 300 cc. of water causes the deposition of crystal which is then filtered, washed with water and dried. Recrystallisation from isopropyl alcohol gives about 23 grams of 2,4-dichlorophenyl iodopropargyl ether, M.P. 93–94° C.

Example 17

67 grams of p-chlorophenyl propargyl ether, B.P. 62–64° C. at 0.15 mm. Hg are dissolved in 500 cc. of methanol and the resulting solution is mixed with a solution of 36 grams of sodium hydroxide in 50 cc. of water. The admixture is cooled in an ice-water bath and then added under agitation with 103.0 grams of iodine in small portions at the temperature of 5–10° C. After the whole amount of iodine has been added, the agitation is continued for further one hour. Subsequent addition of 500 cc. of water causes the deposition of crystal which is filtered, washed with water and dried. Recrystallisation from normal hexane gives about 92.5 grams of p-chlorophenyl iodopropargyl ether, M.P. 52–53° C.

Example 18

A solution of 18.6 grams of p-iodophenyl propargyl ether, M.P. 42–44° C. in 150 cc. of methanol is mixed with a solution of 11.5 grams of sodium hydroxide in 20 cc. of water. The resulting admixture is cooled in an ice-water bath and then added under agitation with 18.3 grams of iodine. Agitation is continued for further 2 hours. Addition of 200 cc. of water causes the precipitation of a crude product which is then filtered, washed with water and dried. Recrystallisation from normal hexane gives about 18.0 grams of p-iodophenyl iodopropargyl ether, M.P. 98–99° C.

Example 19

A solution of 3.2 grams of p-fluorophenyl propargyl ether in 100 cc. of methanol is mixed with a solution of 3.2 grams of sodium hydroxide in 10 cc. of water. The resulting admixture is cooled in an ice-water bath and then added with 5.4 grams of iodine under agitation. After 2 hours, the reaction mixture is distilled under reduced pressure to remove the methanol. The residue is extracted with ether, the ethereal extract is dried and the solvent is distilled off therefrom. The remaining liquid is distilled under a reduced pressure of 0.2 mm. Hg to yield about 3.1 grams of p-fluorophenyl iodopropargyl ether which is distilled out at the temperature of 101–102° C.

Example 20

A solution of 6.4 grams of hydroquinone dipropargyl ether, M.P. 48–48.5° C. in 50 cc. of methanol is mixed with a solution of 6.0 grams of sodium hydroxide in 10 cc. of water. The resulting admixture is cooled in an ice-water bath and then added with 18.5 grams of iodine under agitation. The agitation is continued for further one hour, and subsequent addition of 100 cc. of water causes the precipitation of a crude product which is filtered, washed with water and dried. Recrystallisation from methanol gives about 6.4 grams of p-propargyloxyphenyl iodopropargyl ether, M.P. 121–122° C.

*Example 21*

A solution of 1.92 grams of para-β-hydroxyethoxyphenyl propargyl ether, M.P. 74–75° C. in 20 cc. of methanol is mixed with a solution of 0.9 gram of sodium hydroxide in 3 cc. of water. The resultant admixture is cooled in an ice-water bath and then added with 2.55 grams of iodine under agitation. After 1 hour, a crude product precipitated, is filtered, washed with water and dried. Recrystallisation from isopropyl alcohol gives about 2.85 grams of para-β-hydroxyethoxyphenyl iodopropargyl ether, M.P. 73.5–74.5° C.

*Example 22*

A solution of 13.5 grams of p-diphenyl propargyl ether, M.P. 76–78° C. in 130 cc. of methanol is mixed with a solution of 16 grams of sodium hydroxide in 20 cc. of water. The admixture is cooled in an ice-water bath and then added with 16.5 grams of iodine under agitation. After 1 hour, the crystal deposited is filtered, washed with water and dried. Recrystallisation from isopropyl alcohol gives about 10.0 grams of p-diphenyl iodopropargyl ether, M.P. 124–125° C.

*Example 23*

A solution of 4.5 grams of 2,6-dibromo-4-ethoxymethylphenyl propargyl ether, M.P. 68–70° C. in 40 cc. of methanol is mixed with a solution of 5.6 grams of sodium hydroxide in 10 cc. of water. The resulting admixture is cooled in an ice-water bath and then added with 3.6 grams of iodine under agitation. The crystal deposited is filtered, washed with water and dried. Recrystallisation from normal hexane gives about 3.0 grams of 2,6-dibromo-4-ethoxymethylphenyl iodopropargyl ether, M.P. 67.5–68° C.

*Example 24*

A solution of 5.0 grams of 2-nitro-4-methylphenyl propargyl ether, M.P. 54.5–55.5° C. in 100 cc. of methanol is mixed with a solution of 2.3 grams of sodium hydroxide in 6 cc. of water. The resulting admixture is cooled and then added with 6.7 grams of iodine under agitation. Agitation is continued for further 2 hours. Subsequent addition of 100 cc. of water causes the deposition of crystal which is then filtered, washed with water and dried. Recrystallisation from isopropyl alcohol gives about 7.2 grams of 2-nitro-4-methylphenyl iodopropargyl ether, M.P. 111–111.5° C.

*Example 25*

A solution of 6.9 grams of 3-nitro-4-methylphenyl propargyl ether, M.P. 45–46° C. in 150 cc. of methanol is mixed with a solution of 3.3 grams of sodium hydroxide in 5 cc. of water. The resultant admixture is cooled in an ice-water bath and then added with 9.2 grams of iodine under agitation. The agitation is continued for further 2 hours, and subsequent addition of 200 cc. of water causes the precipitation of a crude product which is then filtered, washed with water and dried. Recrystallisation from n-hexane gives about 10.0 grams of 3-nitro-4-methylphenyl iodopropargyl ether, M.P. 102.5–103.5° C.

*Example 26*

A solution of 5.0 grams of p-acetylphenyl propargyl ether, M.P. 76.5–77.5° C. in 100 cc. of methanol is mixed with a solution of 2.5 grams of sodium hydroxide in 10 cc. of water. The resulting admixture is cooled in an ice-water bath and then added with 7.3 grams of iodine under agitation. Addition of 100 cc. of water subsequent to one hour's agitation causes the deposition of crystal which is then filtered, washed with water and dried. Recrystallisation from methanol gives about 3.5 grams of p-acetylphenyl iodopropargyl ether, M.P. 117–118° C.

*Example 27*

A solution of 1.27 grams of p-dichloroacetylaminophenyl propargyl ether, M.P. 124–124.5° C. in 20 cc. of methanol is mixed with a solution of 0.5 gram of sodium hydroxide in 2 cc. of water. The resulting admixture is cooled in an ice-water bath and then added with 1.25 grams of iodine under agitation. The agitation is continued for further one hour, and subsequent addition of 50 cc. of water causes the deposition of crystal which is then filtered, washed with water and dried. Recrystallisation from isopropyl alcohol gives about 1.3 grams of p-dichloroacetylaminophenyl iodopropargyl ether, M.P. 148.5–149° C.

*Example 28*

A solution of 10.5 grams of 5-chloro-2-propargyloxy benzamide, M.P. 134.5–135.5° C. is 150 cc. of methanol is mixed with a solution of 4.4 grams of sodium hydroxide in 10 cc. of water. The admixture is cooled and then added with 12.7 grams of iodine under agitation at the temperature of approximately 5° C. After 1 hour's agitation, the crystal deposited is filtered, washed with methanol and subsequently with water and then dried. Recrystallisation from methanol gives about 13.3 grams of 5-chloro-2-iodopropargyloxy benzamide, M.P. 169.5–170.5° C.

*Example 29*

8.8 grams of p-carboxyphenyl propargyl ether with decomposition point of 210–211° C., are added with 100 cc. of water and 6.6 grams of sodium hydroxide. The resulting admixture is cooled in an ice-water bath and then added further with 12.7 grams of iodine under agitation. After one hour's agitation, the mixture is made acidic by addition of hydrochloric acid. The precipitation deposited is filtered, washed with water and dried. Recrystallisation from methanol gives about 13.7 grams of p-carboxyphenyl iodopropargyl ether which decomposed at 220° C.

*Example 30*

A solution of 51 grams of p-chlorophenyl propargyl ether in 300 cc. of methanol is mixed with a solution of 28 grams of sodium hydroxide in 40 cc. of water. The resulting admixture is cooled in an ice-water bath and then added under agitation with 49.0 grams of bromine in small portions while the temperature of the mixture is kept at 5–10° C. After the whole amount of bromine has been added, agitation is continued for further 1 hour. Subsequent addition of 500 cc. of water causes the deposition of crystal which is then filtered, washed with water and dried. Recrystallisation from petroleum ether gives about 38.7 grams of p-chlorophenyl bromopropargyl ether, M.P. 50.5–51.5° C.

*Example 31*

A solution of 13.7 grams of p-bromophenyl propargyl ether, B.P. 80–87° C. at 1.5 mm. Hg in 200 cc. of methanol is mixed with a solution of 12 grams of sodium hydroxide in 15 cc. of water. The resulting admixture is cooled in an ice-water bath and then dropwise added under agitation with 10.4 grams of bromine while the temperature of the mixture is kept at 5–10° C. After the whole amount of bromine has been added, the agitation is continued for further 1 hour. Methanol is distilled off under a reduced pressure. After addition of 200 cc. of water, the mixture is extracted with ether and the etheral extract is washed with water, dried and then distilled to remove the solvent. Recrystallisation of the residue from n-hexane gives about 5.5 grams of p-bromophenyl bromopropargyl ether, M.P. 58–59.5° C.

Example 32

A solution of 10.0 grams of 2,4,5-trichlorophenyl propargyl ether, M.P. 64–65° in 100 cc. of methanol is mixed with a solution of 3.4 grams of sodium hydroxide in 10 cc. of water. The resulting admixture is cooled in an ice-water bath and then dropwise added with 6.7 grams of bromine under agitation while the temperature of the mixture is kept at about 5° C. After the whole amount of bromine has been added, the agitation is contained for further one hour. Subsequent addition of 200 cc. of water causes the deposition of crystal which is then filtered, washed with water and dried. Recrystallisation from isopropyl alcohol gives about 6.5 grams of 2,4,5-trichlorophenyl bromopropargyl ether, M.P. 102.5–103.5° C.

Example 33

A suspension of 9.0 grams of p-cyanophenyl propargyl ether, M.P. 112–113° C. in 100 cc. of ethanol is mixed with an aqueous solution of 10 grams of potassium hydroxide in 10 cc. of water. The resulting mixture is added with 16.0 grams of iodine in small portions under agitation while being cooled in an ice-water bath. After the whole amount of iodine has been added, the agitation is continued for further 3 hours. The reaction mixture is then added with 300 cc. of water, and the precipitation deposited is filtered, washed with water and dried. Recrystallisation from ethanol gives about 12.0 grams of p-cyanophenyl iodopropargyl ether, M.P. 161–162° C.

Example 34

A solution of 3.35 grams of sodium hydroxide in 10 cc. of water is mixed with 100 cc. of methanol, and the mixture is cooled in an ice-water bath under agitation to which are then added 7.25 grams of p-carbomethoxyphenyl propargyl ether. The resulting admixture is subsequently added with 9.65 grams of diodine in small portions while the temperature of the mixture is kept at 5–10° C. After the whole amount of iodine has been added, the agitation is further continued for 1 hour. Addition of 300 cc. of water causes the deposition of the precipitation which is then filtered, washed with water and dried. Recrystallisation from methanol gives about 9.65 grams of p-carbomethoxyphenyl iodopropargyl ether, M.P. 97–98° C.

Example 35

A solution of 3.3 grams of sodium hydroxide in 10 cc. of water is mixed with 100 cc. of methanol. The mixture is cooled in an ice-water bath under agitation to which are then added 7.1 grams of p-carbomethoxyphenyl propargyl ether and subsequently 7.3 grams of bromine dropwise in small portions while the temperature of the mixture is kept at 5–10° C. After the whole amount of bromine has been added, the agitation is continued further for 30 minutes. Subsequent addition of 300 cc. of water causes the deposition of the precipitation which is then filtered, washed with water and dried. Recrystallisation from methanol gives about 8.5 grams of p-carbomethoxyphenyl bromopropargyl ether, M.P. 77.5–78.5° C.

What we claim is:

1. Iodopropargyl aryl ether compounds represented by the general formula:

$$Ar-O-CH_2-C\equiv C-I$$

wherein Ar stands for substituted phenyl and naphthyl groups which carry on the aromatic nucleus substituents selected from the group consisting of halogen, nitro, cyano, lower alkyl, lower alkoxy, lower alkynyloxy, hydroxy lower alkoxy, phenyl and acetyl radicals.

2. 2,4,5-trichlorophenyl iodopropargyl ether.
3. 2,6-dichlorophenyl iodopropargyl ether.
4. p-Bromophenyl iodopropargyl ether.
5. p-Nitrophenyl iodopropargyl ether.
6. 2,4-dichlorophenyl iodopropargyl ether.
7. p-Chlorophenyl iodopropargyl ether.
8. p-Iodophenyl iodopropargyl ether.
9. 2-methyl-4,6-dichlorophenyl iodopropargyl ether.
10. p-Fluorophenyl iodopropargyl ether.
11. 2-nitro-4-methylphenyl iodopropargyl ether.
12. 3-nitro-4-methylphenyl iodopropargyl ether.
13. p-Cyanophenyl iodopropargyl ether.

References Cited

UNITED STATES PATENTS

| | | | |
|---|---|---|---|
| 2,857,309 | 10/1958 | Barthel | 167—30 |
| 2,872,367 | 2/1959 | Haynes et al. | 167—30 |
| 2,921,961 | 1/1960 | Muller et al. | 260—562 |
| 2,942,014 | 6/1960 | Cameron. | |
| 2,993,934 | 7/1961 | Rosen | 260—612 |

OTHER REFERENCES

Coates: Organo-Metallic Compounds, 1960, pp. 353–354.

Hatch et al.: Journal of Organic Chemistry, 1958, pp. 397–401.

Houben-Weyl: Methoden der Organischen Chemie-Halogen Verbindungen Fluor und Chlor, 1952, pp. 593–595.

Jacobs et al.: Journal of American Chemical Society, 1940, vol. 62, pp. 1849–54.

Reppe et al.: Justus Liebigs Annalen der Chemie, Bd. 596, pp. 70–79.

CHARLES B. PARKER, *Primary Examiner.*

IRVING MARCUS, *Examiner.*

DALE R. MAHANAND, DOLPH H. TORRENCE,
*Assistant Examiners.*